United States Patent [19]

Isono et al.

[11] Patent Number: 4,680,639

[45] Date of Patent: Jul. 14, 1987

[54] VIEWFINDER FOR TV CAMERA USE WITH MEANS FOR ENHANCING THE CONTRAST LEVEL OF THE VIEWFINDER IMAGE

[75] Inventors: Haruo Isono; Hideo Kusaka; Takeshi Hasegawa, all of Tokyo, Japan

[73] Assignee: Nippon Hoso Kyokai, Japan

[21] Appl. No.: 761,505

[22] Filed: Aug. 1, 1985

[30] Foreign Application Priority Data

Aug. 9, 1984 [JP] Japan ............................... 59-165583

[51] Int. Cl.$^4$ ............................................. G03B 13/02
[52] U.S. Cl. .................................... 358/224; 358/227; 358/37
[58] Field of Search ................... 358/166, 227, 51, 37, 358/224

[56] References Cited

U.S. PATENT DOCUMENTS

| | | | |
|---|---|---|---|
| 3,715,473 | 2/1973 | Tan | 358/37 |
| 3,732,360 | 5/1973 | Breimer et al. | 358/37 |
| 3,920,889 | 11/1975 | Connor | 358/166 |
| 3,938,181 | 2/1976 | Avins | 358/37 |
| 4,041,531 | 8/1977 | Bingham | 358/37 |
| 4,148,059 | 4/1979 | Dillon et al. | 358/37 |
| 4,481,540 | 11/1984 | Bergen | 358/224 |

FOREIGN PATENT DOCUMENTS

| | | | |
|---|---|---|---|
| 3315857 | 10/1984 | Fed. Rep. of Germany . | |
| 0128790 | 12/1984 | France . | |
| 0191557 | 11/1983 | Japan | 358/166 |
| 2145902 | 4/1985 | United Kingdom | 358/37 |
| 0788439 | 12/1980 | U.S.S.R. | 358/166 |

OTHER PUBLICATIONS

European Search Report of EP No. 85 11 0005.

Primary Examiner—Gene Z. Rubinson
Assistant Examiner—Stephen Brinich
Attorney, Agent, or Firm—Parkhurst & Oliff

[57] ABSTRACT

The picture signal to be displayed on the viewfinder is corrected so as to be adaptive to the spatial frequency performance of visual system at close viewing distance of about three times of the viewing screen height. As a result, the luminance or the coloring of edge portions of the viewed picture is clearly emphasized and hence accurate and rapid focusing of pickup lens provided in any kind of TV camera is facilitated without conventional trial and error.

4 Claims, 25 Drawing Figures

V.C.C. : Vertical Contour Circuit
H.C.C. : Horizontal Contour Circuit
L.P.F : Lowpass Filter
f(t) : Input Luminance Signal
f(t-H) : IH Delay Signal
f(t-2H) : 2H Delay Signal
f(t-H-T₁) : (H+T₁) Delay Signal
f(t-H-2T₁) : (H+2T₁) Delay Signal FIG_1a
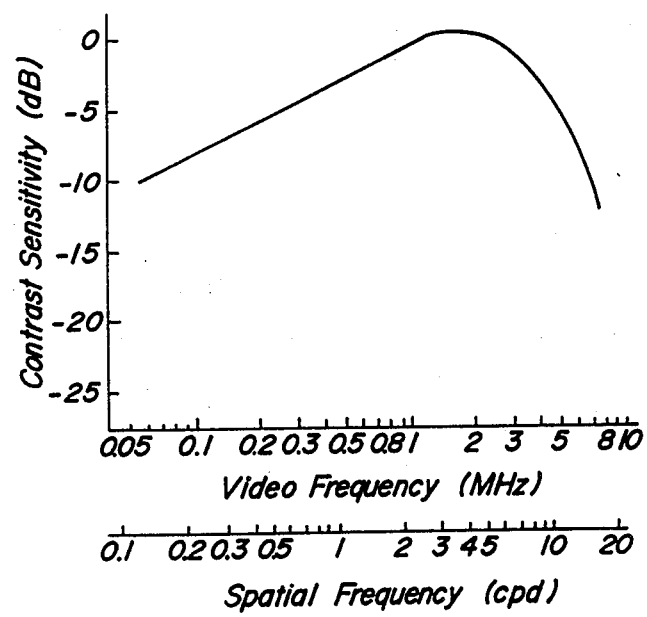
FIG_1b
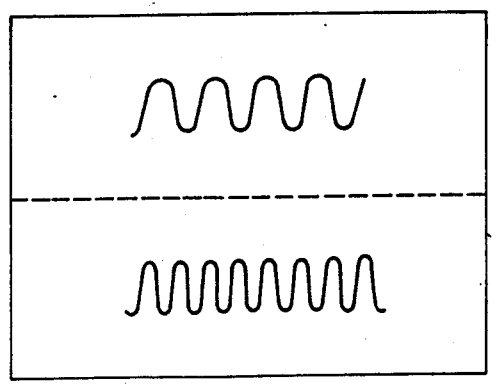

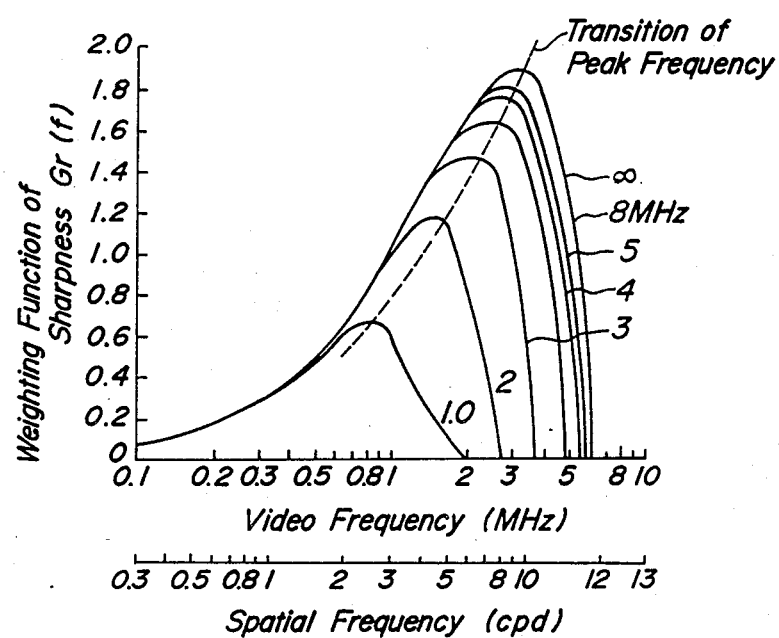
FIG_2

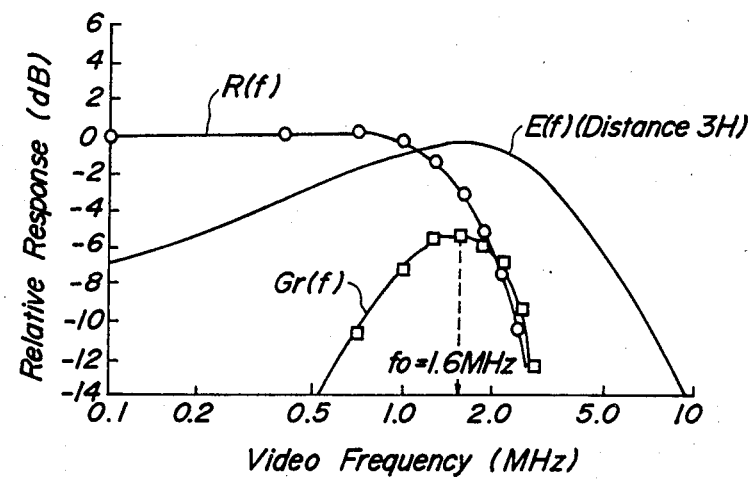
FIG_3
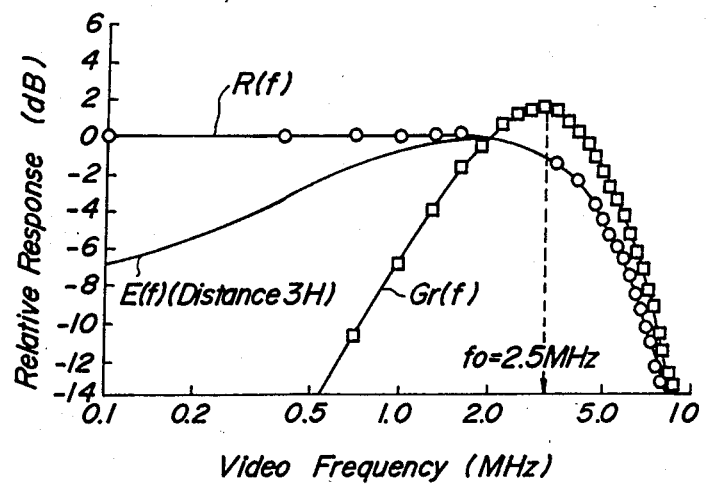
FIG_4

V.C.C. : Vertical Contour Circuit
H.C.C. : Horizontal Contour Circuit
LPF : Lowpass Filter
$f(t)$ : Input Luminance Signal
$f(t-H)$ : 1H Delay Signal
$f(t-2H)$ : 2H Delay Signal
$f(t-H-T_1)$ : $(H+T_1)$ Delay Signal
$f(t-H-2T_1)$ : $(H+2T_1)$ Delay Signal LPF1: Lowpass Filter 1
$\exp\{-(f/f_1)^2\}$ LPF2: Lowpass Filter 2
$\exp\{-(f/f_2)^2\}$ IN.: Television Original Signal Input OUT.: Bandpass Filter Output FIG_13
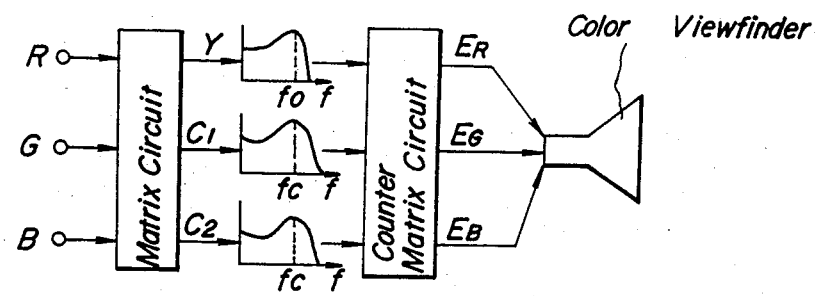
FIG_14
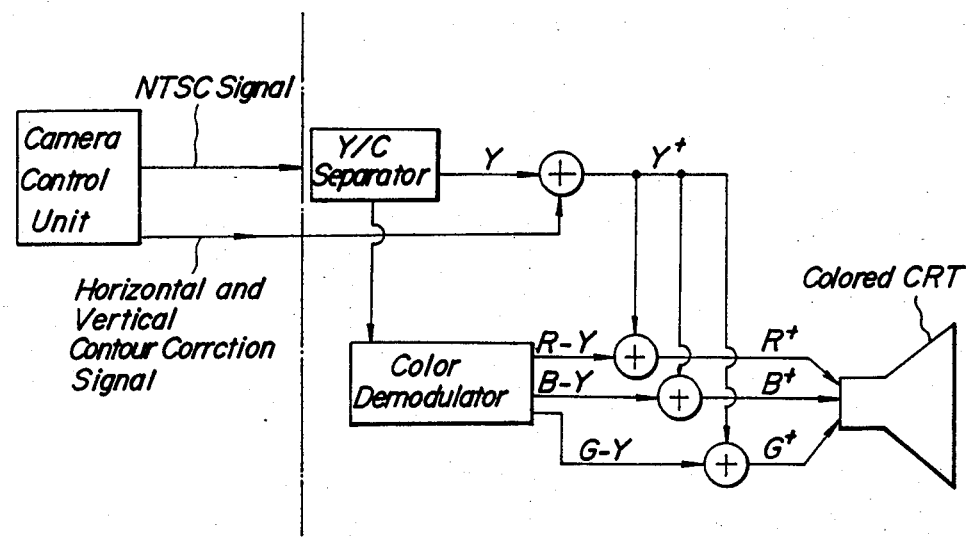

FIG_15
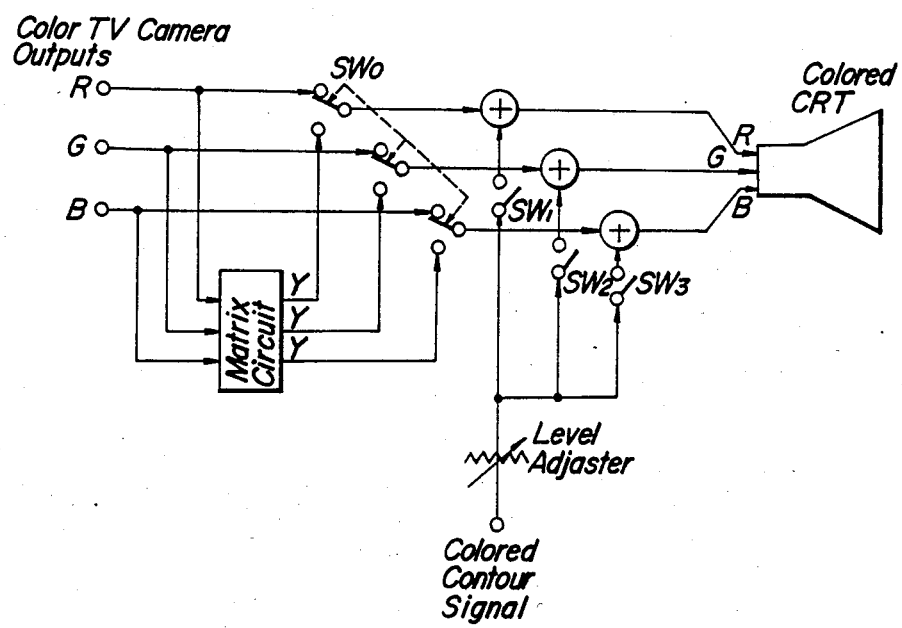

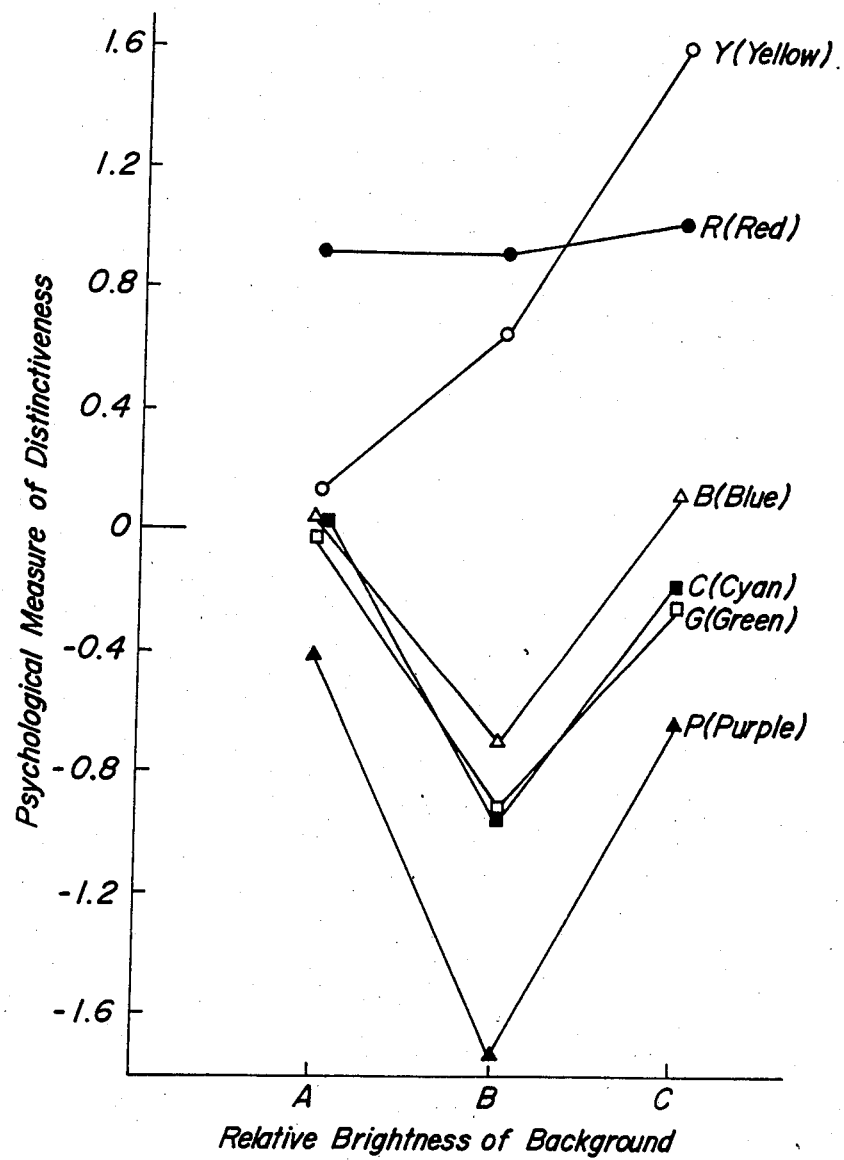

FIG_17a
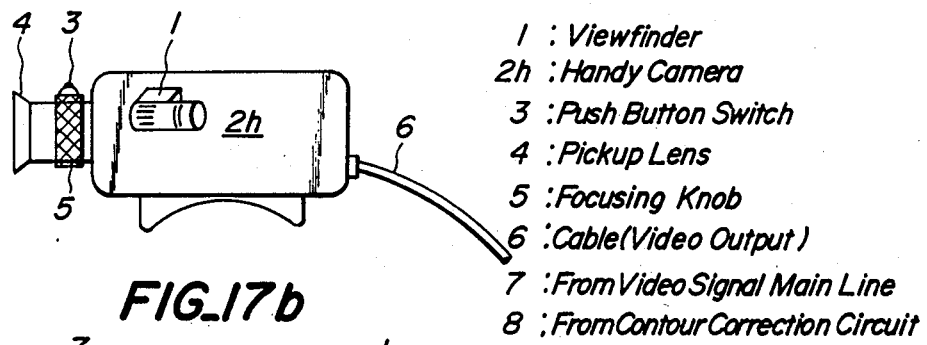
1 : Viewfinder
2h : Handy Camera
3 : Push Button Switch
4 : Pickup Lens
5 : Focusing Knob
6 : Cable (Video Output)
7 : From Video Signal Main Line
8 : From Contour Correction Circuit
FIG_17b
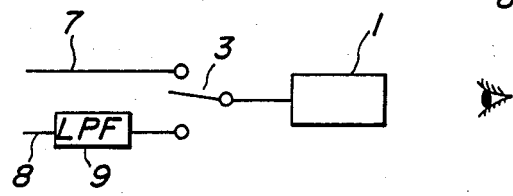
FIG_18a
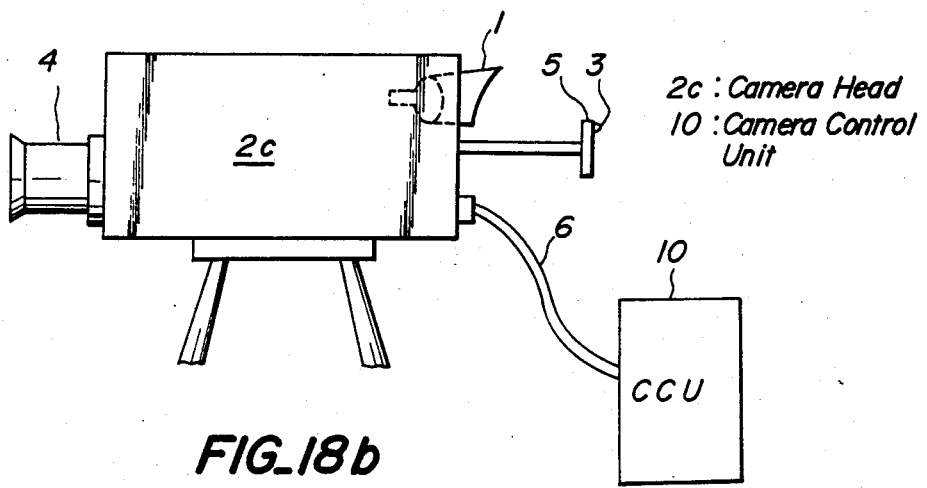
2c : Camera Head
10 : Camera Control Unit
FIG_18b
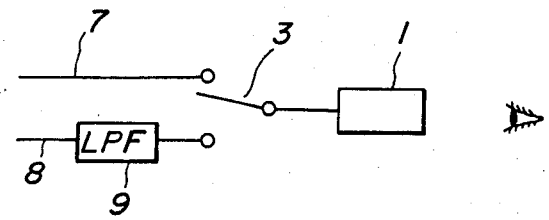

VIEWFINDER FOR TV CAMERA USE WITH MEANS FOR ENHANCING THE CONTRAST LEVEL OF THE VIEWFINDER IMAGE

BACKGROUND OF THE INVENTION

1. Field of the Invention and Related Art Statement:

The present invention relates to a small-size electronic viewfinder adapted to a handy camera for broadcast use, an industrial television (ITV) camera, a camera for home video use and the like as well as to a high definition television camera, particularly, to a viewfinder of this kind, the focusing of which onto a target can be remarkably easily adjusted in comparison with the conventional one.

It is fairly difficult to instantaneously and skillfully adjust the focusing of the conventional viewfinder provided with a small-sized (CRT) of, for instance, 1.5 to 2 inch with one eye. Particularly, it is still more in the situation of the ordinary moving scenery. Meanwhile, in the situation of the high quality television featured by the high definition and the large screen, a gross deterioration of definition is caused even by a slight misadjustment of the focusing of the camera, which is enlarged in the viewing screen.

Consequently, it is regarded by the group of cameramen that the adjustment of the camera focusing is a significant difficulty on the application of the camera. It is because the absolute area of the viewing screen of the small-sized CRT provided in the viewfinder is too small to accurately find the viewed target thereon, as well as the muscles driven for controlling the function of eyeball regulation is apt to be imposed with the burden based on the alternate operation thereof between the natural viewing and the close gazing on the viewfinder with one eye at close range. This is still more for persons of old year and of farsightedness.

On the other hand, in the conventional viewfinder provided with the small-sized CRT, the picture viewed thereon is not necessarily clear because of the coarse pitch of the shadowmask thereof and the limited bandwidth of the composite color television signal displayed thereon, and further the dot interference caused by the 3.58 MHz color subcarrier is added to the above, so that the adjustment of the focusing is extremely difficult.

As a result, although a colored viewfinder has been strongly demanded for a long time, it has been scarcely realized except for a few special kinds of television cameras.

SUMMARY OF THE INVENTION

An object of the present invention is to provide a viewfinder for TV camera use from which the difficulties as caused in the conventional electronic viewfinder provided for the handy camera for broadcast use, such as the adjustment of focusing thereof is troublesome because of the hard visibility of the picture viewed on the narrow screen having small absolute area of the small-sized CRT provided therein and hence too long time duration is necessitated for the camera alignment with the inconvenience accompanying to the employment of the camera, are sufficiently removed.

For attaining the above object, the viewfinder according to the present invention is provided with specified means for preparing the most accurate picture displayed on the screen of the CRT provided therein by sufficiently adapting the picture displayed on the screen and the property of the visual system thereof to each other, in order to facilitate the rapid adjustment of the focusing at close range.

Therefore, the viewfinder for TV camera use according to the present invention is featured in that a contour signal in the horizontal direction of a screen of the viewfinder, which signal is formed in relation to a sharpness correction function obtained on the basis of the spatial frequency characteristic of human visual system in which the visual range is set up substantially equal to three times of the height of the screen and the transfer frequency performance within the viewfinder, is added to a picture signal to be displayed on the screen.

BRIEF DESCRIPTION OF THE DRAWINGS

For the better understanding of the invention, reference is made to the accompanying drawings, in which:

FIG. 1(a) is a diagram showing the visual spatial frequency characteristic obtained by an experiment effected at close range;

FIG. 1(b) is a diagram showing a behavior of the experiment;

FIG. 2 is a diagram showing the variation of the weighting function of sharpness calculated in response to the transfer bandwidth;

FIGS. 3 and 4 are diagrams showing correction functions for obtaining the most adaptive response of the viewfinders of 1.5 inch type and of 7 inch type respectively;

FIGS. 11, 12, 13, 14 and 15 are block diagrams showing various examples of a contour correction signal adding circuit respectively;

FIG. 16 is a graph showing experimental results obtained through the circuit as shown in FIG. 15;

FIGS. 17(a) and 17(b) and 18(a) and 18(b) are diagrams showing examples of outlines and circuit configurations of the TV camera provided with the viewfinder according to the present invention respectively.

DESCRIPTION OF THE PREFERRED EMBODIMENTS

Figure 5:
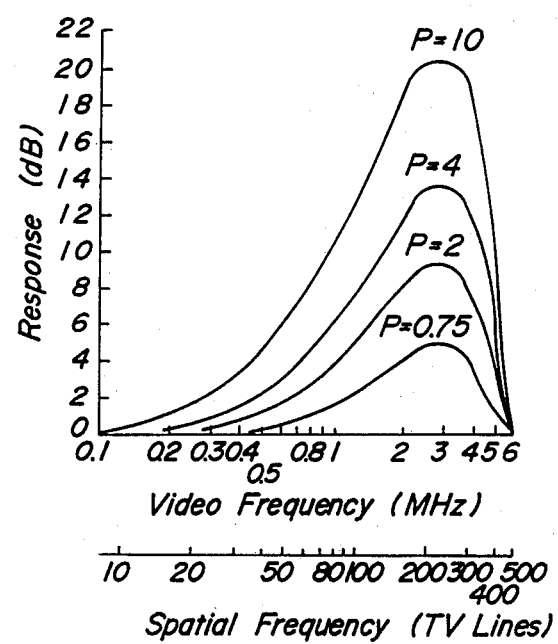
FIG. 5 is a diagram showing the variation of frequency responses of the picture signal which are calculated in response to the contour correction effected through the time duration of one scanning line.

Prior to the description of embodiments of the present invention, the principle of the operation of the viewfinder according to the present invention will be described in detail hereinafter.

In order to facilitate the rapid and skillful adjustment of focusing of the picture displayed on the screen of the small-sized CRT provided in the viewfinder attached to the TV camera at close range as arranged within two or three times of the screen height "H", it is required to prepare the most accurate picture on the screen. Therefor, the sufficient adaptation between the picture on the screen and the property of the visual system is necessitated. The resolvability of the visual system over the spatial image is well known as the so-called Modulation Transfer Function (shortened by "MTF" hereinafter) thereof, which indicates a band pass type characteristic curve having a lump in the middle frequency range as shown in FIG. 1(a).

FIG. 1(a) shows the spatial frequency characteristic of the visual system situated as the viewing distance of 3H, the viewed contrast corresponding to the 50% modulation and the viewed luminance of 50 candle/-square meter ($Cd/m^2$), which is indicated by a characteristic curve plotted with regard to the spatial frequency presented by a unit of cycle per degree (cpd) together with the video frequency presented by a unit of mega Herz (MHz) on the abscissa and the sensitivity of contrast presented by a relative unit, that is, deci Bel (dB) on the ordinate.

In this connection, the spatial frequency performance of the visual system as shown in FIG. 1(a) can be obtained by the following measurement.

The viewing screen of a high resolution non-chromatic television monitor to be viewed by a subject is divided into upper and lower section as shown in FIG. 1(b). On the upper section of the screen, a sine-wave luminance striped reference pattern having the contrast corresponding to the 50% modulation at a constant frequency of, for instance, 0.2 MHz, which is coupled in phase with the horizontal synchronizing pulse (HD), is displayed. In this connection, in the sine-wave luminance striped pattern having the contrast corresponding to the 50% modulation contrast, the condition as defined by the following value is equal to 50%, when the maximum luminance of this pattern is denoted by $l_{max}$, as well as the minimum luminance thereof is denoted by $l_{min}$. The modulation contrast is defined as follows.

$$\frac{l_{max} - l_{min}}{l_{max} + l_{min}} \times 100(\%)$$

Meanwhile, on the lower section of the screen, a similar vertical sinusoidal luminance striped pattern contrast having the contrast corresponding to the 50% modulation contrast at various measuring frequencies is displayed.

These two kinds of patterns displayed on the upper and the lower sections respectively are simultaneously gazed by the subject. In this situation, the modulation contrast of the picture displayed on the lower section is varied by the subject, so as to obtain the same contrasts on these two kinds of patterns by subjective judgements. The resultant variation of the modulation is plotted on the ordinate as the contrast sensitivity. In this situation, the original luminances of the upper and the lower sections of the viewing screen should be maintained at a constant level, for instance, of 50 $cd/m^2$.

In general, the aforesaid modulation transfer function MTF of the visual system is varied on the viewing conditions including the visual angle, the modulation contrast and the original luminance of screen. So that, it is not appropriate in the situation where the viewing is effected at close visual angle within 2H to 3H similarly as in the viewfinder, to investigate the matter on the basis of the MTF thereof at the most suitable range within 5H to 7H for the television receiver as reported by the most of vision researchers. Nevertheless, the MTF data of the visual system at close range has not yet been reported. Consequently, the matter cannot help being investigated on the basis of the visual MTF obtained by the present inventors at close range within 3H as shown in FIG. 1(a). As is apparent from the characteristic curve as shown in FIG. 1(a), the highest contrast sensitivity in the visual system at close range is obtained at 3.5 to 4 cycle/degree of visual angle corresponding to video frequency 1.7 to 2 MHz.

Next, the method for obtaining the most accurate picture adapted to the above visual MTF as shown in FIG. 1(a) on the screen of the viewfinder will be described as follows.

The sharpness of the displayed image is contributed by the spatial frequency response of the transmission system at a high frequency shown in FIG. 2, which rate presents the nonlinearity such as varied in response to the transfer bandwidth as well as to the visual MTF in addition. The weighting function Gr(f) of the sharpness of image as shown in FIG. 2 is defined by the following equation (1).

$$Gr(f) = 2 \cdot f \cdot R(f) \cdot E(f) \qquad (1)$$

where f denotes the video frequency, R(f) and E(f) denote the frequency response of the transfer system and the spatial frequency response of the visual system respectively.

Various characteristic curves as shown in FIG. 2 are resulted from the calculation of the above equation (1) based on the various parameters R(f). By referring to these curves, a picture information transmission system always provided with the highest visual sharpness can be realized by emphasizing the response R(f) of the transmission system centering around the vicinity of the frequency $f_0$ at which the maximum of the above sharpness weighting function Gr(f) of the visual system can be obtained.

For examples of the above mentioned, various resultant curves indicating the measured transfer frequency response R(f) and the measured visual spatial frequency response E(f) at viewing distance 3H together with the weighting function Gr(f) of the visual MTF calculated at viewing distance 3H according to the above equation (1) for obtaining the frequency $f_0$ corresponding to the maximum thereof with regard to the most customary 1.5 inch type and 7 inch type viewfinders are shown in FIGS. 3 and 4 respectively. As is apparent from the curves as shown in FIGS. 3 and 4, the frequency $f_0 = 1.6$ MHz for the 1.5 inch type viewfinder and the frequency $f_0 = 2.5$ MHz for the 7 inch type viewfinder can be obtained. Therefore, the most accurate picture can be viewed on the respective screens by correcting the response of the visual MTF of these viewfinders respectively centering around the vicinities of these frequencies $f_0$.

In contrast with the above described condition for correcting the most suitable visual response in the horizontal direction of the viewing screen, the transfer frequency range in the vertical direction thereof is defined by the number of scanning lines on the viewing screen and hence is not limited by the transfer bandwidth. So that, in the TV system of 525 scanning lines, the condition of the most suitable correction is established at about 245 TV lines corresponding to about 3 MHz. This condition means that the contour correction in the vertical direction is effected by one scanning line. FIG. 5 shows various frequency response characteristic curves in the situation where the above contour correction by one scanning line is effected. The parameter P as shown in FIG. 5 is the same to the correction coefficient employed in the equation (3) as described later.

However, even when the picture is displayed under the above mentioned condition of contour correction, the output video signal to be transferred through the main line is not affected at all, since the picture to be displayed on the viewfinder is generally free from the main line for transferring the output video signal.

The contour correction for displayed images on the viewfinder with the most suitable response can be realized in practice by referring to the following embodiments.

EMBODIMENT 1

Figure 6:
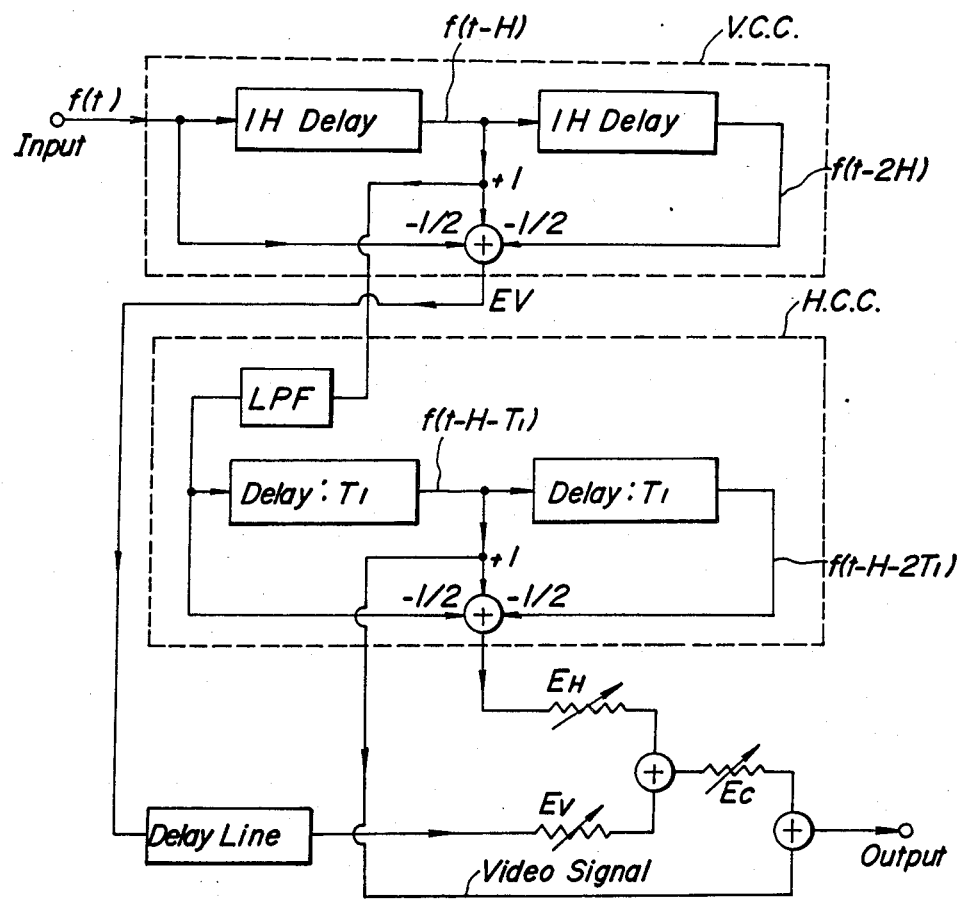
FIG. 6 is a block diagram showing an example of a horizontal and vertical response correction circuit formed of delay lines according to the present invention.

FIG. 6 shows an example of the configuration based on delay lines for the horizontal and vertical response correction circuit according to the present invention.

For this exemplified circuit configuration, the amplitude to frequency performance A(f) under the response correction can be defined by the following equation (2).

$$A(f) = \{1 + b \cdot \sin^2(\pi/2 \cdot f/f_0)\} \sin^2 \pi f t \quad (2)$$

where $f_0 = \frac{1}{2}T_1$ denotes the central frequency for the horizontal response correction, b is a response correction coefficient for defining no correction by $b=0$ and 6 dB correction by $b=1$, and $T_1$ denotes the delayed time duration through the delay line.

With regard to the aforesaid viewfinders of 1.5 inch type and 7 inch type, the above central frequency $f_0$ for the most suitable horizontal response correction becomes $f_0 = 1.6$ MHz and $f_0 = 2.5$ MHz respectively. So that, the delay time duration $T_1$ required for the delay line can be obtained under the relation of $T_1 = \frac{1}{2}f_0$ and as $T_1 = 313$ nsec as for 1.5 inch type, as well as $T_1 = 200$ nsec for 7 inch type.

On the other hand, the vertical response correction performance S(n) effected by employing the 1H delay lines can be defined by the following equation (3).

$$S(n) = \{1 + p \cdot \sin^2(\pi/2 \cdot n/245)\} \sin^2 \pi n t \quad (3)$$

According to the above equation (3), the response correction is maximized, when n=245 TV lines corresponding to the horizontal response 3 MHz.

Figure 7:
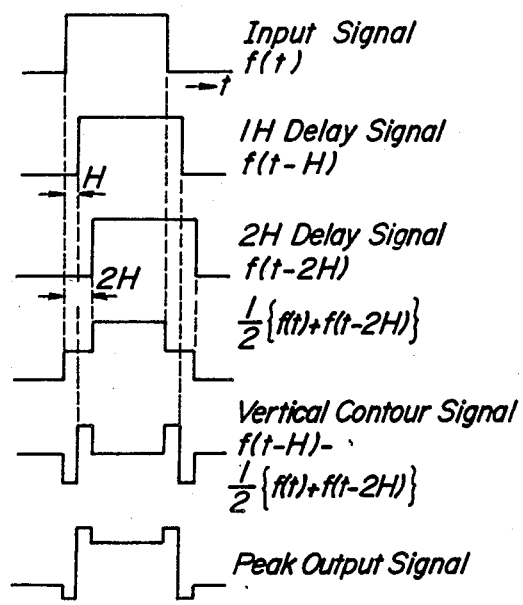
FIG. 7 is a diagram showing a successive variation of waveforms of the vertical contour correction signal formed through 1H delay lines.

FIG. 7 shows an example of various waveforms for successively indicating the process of the formation of the vertical contour correction waveform.

The most suitable response correction signals, namely, the edge signals in the horizontal and the vertical directions, which are obtained as described above, are the very signals provided for establishing the condition of the most favorable sharpness as for the picture to be displayed on the viewfinder. So that, the rapid and skillful adjustment of focusing in the viewfinder provided with the small-sized CRT can be facilitated by utilizing these edge signals. As a result, the focusing on the target can be extremely easily carried out.

In this situation, the adjustment of focusing can be accomplished by displaying only the most suitable response correction signals, namely, the edge signals in the horizontal and the vertical directions obtained as mentioned above on the screen of the viewfinder, as well as accomplished by displaying the picture signal, the edge portions of which are emphasized by adding the above edge signals thereto, on the screen of the viewfinder. Anyhow, the focusing adjustment can be effected on the basis of these edge signals. In this connection, the TV cameras for practical use are originally provided with horizontal and vertical contour compensation circuits in usual. So that, the present invention can be extremely economically applied onto these TV cameras for practical use by utilizing the edge signals formed in these contour compensation circuits as they are.

Next, as for the color TV camera for the broadcast use, the so-called "contour out of green" system provided with the special contour compensation circuit, in which the edge signals are generated from the picture signal in green channel derived from the color TV camera and distributed among three primary color channels, is employed, or, if not so, another system, in which the contour compensation circuits are individually provided for each of three primary color channels, is employed.

However, the contour out of green system has a defect that the contour signal cannot be obtained from the target having no green component, meanwhile the above latter system has a shortcoming that the circuit configuration is composed on a large and expensive scale.

On the contrary, the following skillful system can be realized for the color TV camera for broadcast use according to the present invention.

In the system of the present invention, the luminance signal Y and the modified luminance signal Y' are once formed from the three primary color signals R, G, B derived from the color TV camera. The luminance signal Y is defined by the following equation (4) according to the NTSC system.

$$Y = 0.30R + 0.59G + 0.11B \quad (4)$$

On the other hand, the modified luminance signal Y' is defined, for instance, by the following equation (5), so as to modify the composition ratio of the primary color signals R, G, B from that of the NTSC system, for increasing the composition ratio of the blue signal, since the contour compensation signal can be hardly derived from the luminance signal Y formed on the blue target according to the NTSC system.

$$Y' = 0.25R + 0.5G + 0.25B \quad (5)$$

In this connection, this modified luminance signal Y' can be displayed on the screen of the viewfinder without any inferior effect onto the main line similarly as described earlier.

In the above system of the present invention, the contour compensation signal can be favorably and reasonably derived from this modified luminance signal Y', since the sharpness of the displayed image is mainly determined on the luminance information of the picture.

EMBODIMENT 2

Another example of the method for generating the contour signal adapted to the visual frequency characteristic will be described as follows.

The visual frequency characteristic is presented in relation to the spatial frequency f as shown in FIG. 1(a) and defined by the following equation (6).

$$T(f) = \exp\{-(f/f_2)^2\} - \exp\{-(f_1/f_1)^2\} \quad (6)$$

where $f_1$ denotes the frequency corresponding to the point at which the significant response is initially found, meanwhile $f_2$ denotes the frequency corresponding to the other point at which the significant response is finally extinguished.

Figure 8A:
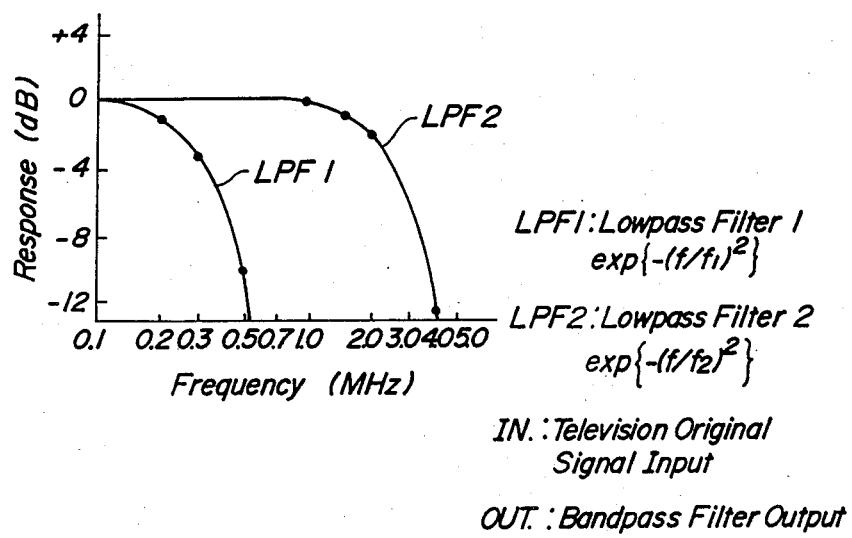
FIGS. 8(a) and 8(b) are diagrams showing a behavior and a configuration of the horizontal contour correction circuit respectively.
Figure 8B:
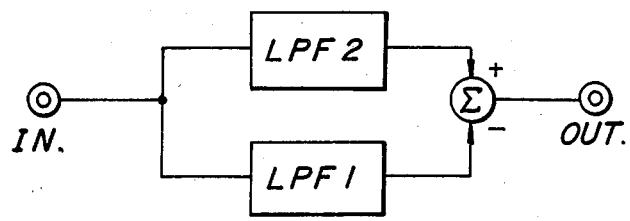

For processing the television signal as mentioned above, it is sufficient that the original picture signal is divided two components through two kinds of Gaussian type lowpass filters having cutoff frequencies $f_1$ and $f_2$ respectively as shown in FIGS. 8(a) and 8(b), the difference between these two components being taken out as a resultant output.

In this connection, the above processing can be applied in the horizontal direction of the viewing screen in relation to vertical lines to be displayed thereon. In contrast therewith, for applying the similar processing in the vertical direction of the viewing screen in relation to horizontal lines to be displayed thereon, the similar lowpass filters can be provided in the vertical direction by processing the original picture signal with respect to each of scanning lines which can be regarded as the least unit in the sampling in the vertical direction, the picture signals residing in each of these scanning lines being added with each other.

The bandpass-filtered picture signal in the horizontal and the vertical directions can be realized by obtaining the differences between the resultant output signals through these lowpass filters in the horizontal and the vertical directions and the original picture signal respectively.

Further speaking in detail, in the situation where the lowpass filter is composed of successive seven scanning lines including the central reference scanning line, the output $T_{LPF}$ thereof can be defined by the following equation (7).

$$T_{LPF} = k_1(T_0 + T_6) + k_2(T_1 + T_5) + k_3(T_2 + T_4) + k_0 T_3 \quad (7)$$

where $k_0 + 2(k_1 + k_2 + k_3) = 1$, $T_3$ denotes the picture signal on the central reference scanning line and $T_0$ to $T_2$ and $T_4$ to $T_6$ denote picture signals on the six scanning lines successively, except the central reference scanning line. In this connection, $k_1$ to $k_3$ are constants provided for defining the leading edge of the step signal.

In this situation, when $T_3 = \sin \omega t$, the following equation can be obtained.

$$T_{3 \pm i} = \sin \omega(t \pm i\tau)$$

where i = 1 to 3 (double symbols to be applied in the same order) and $\tau$ denotes one scanning line interval and hence in the 2 to 1 interlace scanning standard system in which the number of effective scanning lines can be assumed are 480 lines, $\tau \cong 1/240$ and $\omega 2\pi \times N/2$ (N denotes the number of scanning lines arranged in the vertical direction which number defines the resolution in the vertical direction).

The bandpass type performance $T_V$ can be defined as the difference between the original signal $T_3$ and the aforesaid lowpass filter output signal $T_{LPF}$ by the following equation (8).

$$T_V = T_3 - T_{LPF} = (1 - k_0)T_3 - [k_1(T_0 + T_6) + k_2(T_1 + T_5) + k_3(T_2 + T_4)] \quad (8)$$

Figure 9:
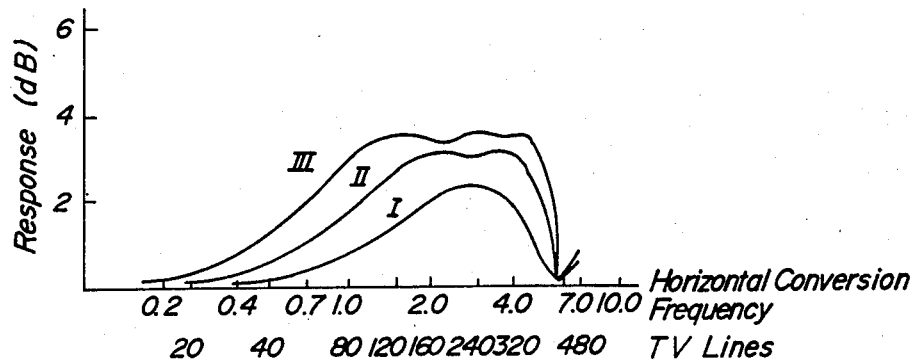
FIG. 9 is a diagram showing the variation of vertical response effected in response to the numbers of delay lines employed for the contour correction.

The definitions presented by one scanning line interval $\tau$ and angular frequency $\omega = 2\pi \times N/2$ as defined in relation to the equation (7) are applid onto the above equation (8), and, as a result, the response with regard to the vertical resolution N can be obtained as shown in FIG. 9. On the abscissa in FIG. 9, the vertical resolution N is plotted in term of the number of scanning lines, and the constants $k_1$ to $k_3$ are selected such as the leading edge of the step is presented by the Gaussian curve.

Figure 10:
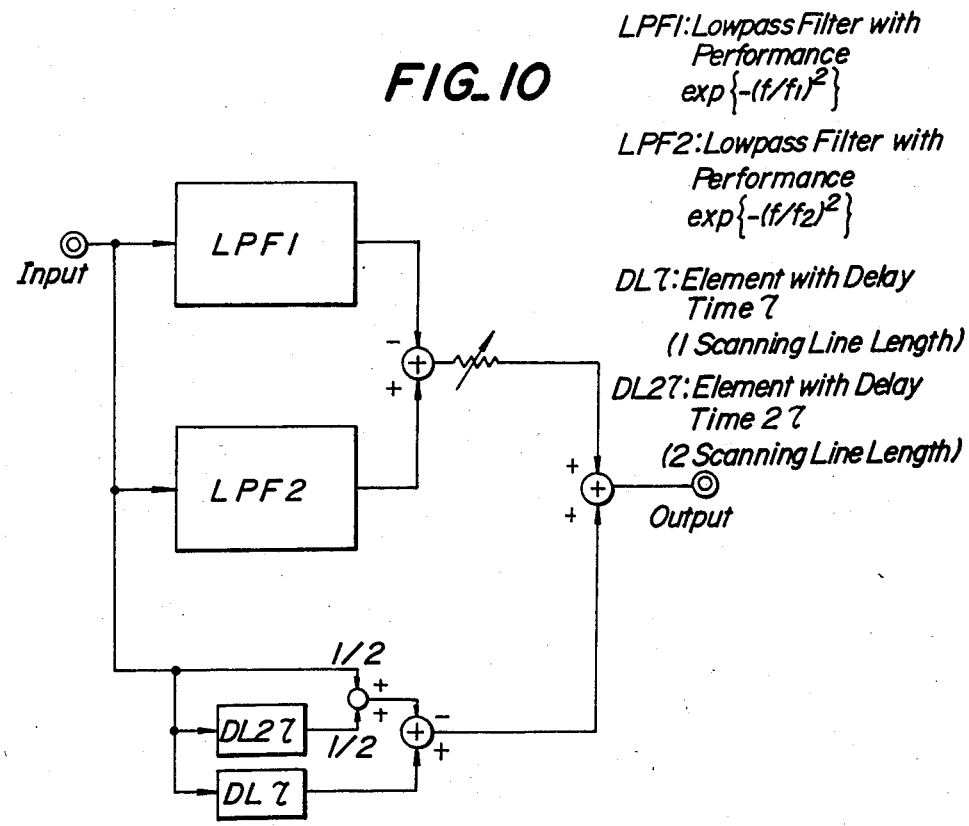
FIG. 10 is a block diagram showing another example of the horizontal and vertical response correction circuit.

In this connection, FIG. 9 shows the results of the similar calculations effected individually with regard to the three scanning lines preceding and following the central reference scanning line respectively, these results being indicated by characteristic curves I, II and III respectively. As is apparent from these curves, it is sufficient to employ the correction effected through the preceding and the following one or two scanning lines. The circuit configuration in practical use is shown in FIG. 10.

The above mentioned bandpass signals in the horizontal and the vertical direction are added to each other, so as to obtain the desired two-dimensional bandpass signal. This resultant bandpass signal is arranged in such a signal form as the adjustment of focusing is maximally facilitated thereby. The employment of this signal intently arranged for the focusing is an evident feature of the present invention.

EMBODIMENT 3

As for the third embodiment of the present invention, the adjustment of focusing in the viewfinder employing the colored CRT will be described.

It is natural that the method for adjusting the focusing can be applied onto the above colored viewfinder as it is. However, under the consideration of the employment of the colored CRT, the focusing adjustment can be further facilitated by utilizing the colored contour signal.

The embodiment adapted to this situation will be concretely described hereinafter.

Figure 11:
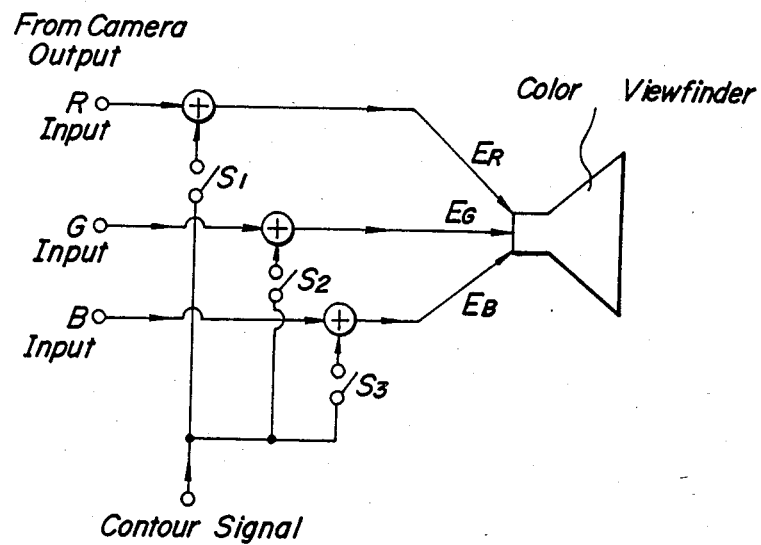

FIG. 11 shows an example of the circuit configuration provided for adding the colored contour signal to the picture signal to be displayed on the color viewfinder. In the configuration, the three switches $S_1$, $S_2$ and $S_3$ provided for individually switching the respective addition of the aforesaid contour signal to each of the three primary color signal derived from the color TV camera are operated individually or in the combination such as $S_1 + S_2$, $S_2 + S_3$ or $S_3 + S_1$. Through these combined operation of these switches, the contour signal colored in yellow, cyan or magenta can be added to the viewed picture signal. In addition, through the operation of these three switches combined in $S_1 + S_2 + S_3$, the ordinary contoured luminance signal can be utilized.

In this connection, the above contour signals employed in the circuit configuration as shown in FIG. 11 have been adapted to the performance of visual system similarly as described earlier.

Figure 12:
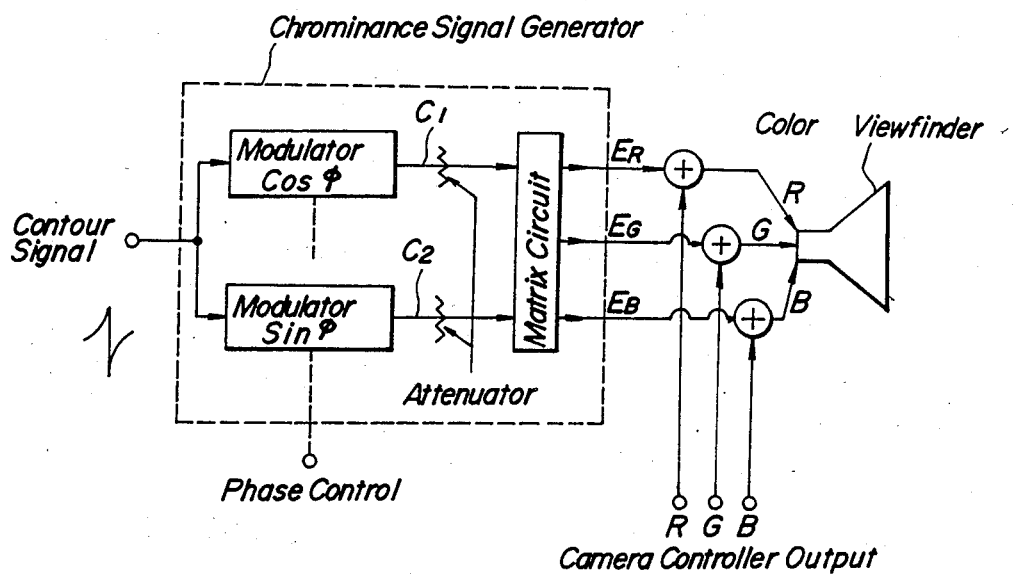

FIG. 12 shows another example of the circuit configuration similarly provided for the color viewfinder. In this configuration, the contour signals employed in the configuration as shown in FIG. 11 are arranged, through color converters denoted by cos $\phi$ and sin $\phi$ respectively, such as the positive and the negative sides of the waveform thereof are respectively colored in paired complementary colors, for instance, in red and in green respectively.

Further speaking in detail, the input contour signal E(t) is firstly converted into two color signals being perpendicular in phase to each other as indicated by the following equations (9).

$$\left. \begin{array}{l} C_1 = E(t) \cdot \cos\phi \\ C_2 = E(t) \cdot \sin\phi \end{array} \right\} \quad (9)$$

Thereafter, these two color signals $C_1$ and $C_2$ are reconverted into three primary color signals $E_R$, $E_G$ and $E_B$ as follows.

$$\left. \begin{array}{l} E_R = E(t) \cdot \cos\phi \\ E_G = -\frac{1}{2} E(t) \cdot \cos\phi - \frac{\sqrt{3}}{2} E(t) \cdot \sin\phi \\ E_B = -\frac{1}{2} E(t) \cdot \cos\phi + \frac{\sqrt{3}}{2} E(t) \cdot \sin\phi \end{array} \right\} \quad (10)$$

These three primary color signals $E_R$, $E_G$ and $E_B$ have the relation in vector therebetween such as the complementally colored contour signal can be obtained as indicated by the following equation.

$$\overset{\circ}{E}_R + \overset{\circ}{E}_G + \overset{\circ}{E}_B = 0$$

So that, these three primary color signals compose the complementally colored contour signal. When the phase $\phi$ thereof is rotated, the complementally colored contour signal with regard to an arbitrary color phase can be obtained.

This complementally colored contour signal is applied onto the color viewfinder individually or together with the primary color picture signals respectively. In this situation, when the most favorable focusing can be once obtained through the complementally colored contour signal, the greatest saturation, that is, the greatest color luminance of the edge portions colored in complementary colors of the viewed color picture can be realized. On the contrary, when the focusing is erroneously adjusted, the edge portions of the viewed color picture have been scarcely colored. Consequently, it is possible for the cameraman to extremely readily adjust the focusing on the basis of the depth of the color on the edge portions.

Next, FIG. 13 shows still another example of the circuit configuration similarly provided for realizing the specially colored contour signal to be added to the viewed color picture signal. In the configuration as shown in FIG. 13, the three primary color picture signals derived from the camera control unit are converted into the luminance signal Y and two color signals $C_1$ and $C_2$ through the matix circuit. In a situation where the I and Q signals according to the NTSC system are selected for these two color signals $C_1$ and $C_2$, the matrix constants to be employed are defined by the following equation (11).

$$\begin{pmatrix} Y \\ I \\ Q \end{pmatrix} = \begin{pmatrix} 0.30 & 0.59 & 0.11 \\ 0.60 & -0.28 & -0.32 \\ 0.21 & -0.52 & 0.31 \end{pmatrix} \begin{pmatrix} R \\ G \\ B \end{pmatrix} \quad (11)$$

On the other hand, in another situation where the color difference signals (R−Y) and (B−Y) are selected for these two color signals $C_1$ and $C_2$, the matrix constants to be employed are defined by the following equation (12).

$$\begin{pmatrix} Y \\ R-Y \\ B-Y \end{pmatrix} = \begin{pmatrix} 0.30 & 0.59 & 0.11 \\ 0.61 & -0.51 & -0.10 \\ -0.14 & -0.29 & 0.43 \end{pmatrix} \begin{pmatrix} R \\ G \\ B \end{pmatrix} \quad (12)$$

On the still other hand, in still another situation where the high definition television system is employed, these two color signals $C_1$ and $C_2$ should be formed of the wideband and the narrowband color signals $C_W$ and $C_N$ provided for transferring the color information according to the high definition television system, and hence the matrix constants to be employed are defined by the following equation (13).

$$\begin{pmatrix} Y \\ C_W \\ C_N \end{pmatrix} = \begin{pmatrix} 0.30 & 0.59 & 0.11 \\ 0.63 & -0.47 & -0.16 \\ -0.03 & -0.38 & 0.41 \end{pmatrix} \begin{pmatrix} R \\ G \\ B \end{pmatrix} \quad (13)$$

Thereafter, in the channels provided not only for the luminance signal Y but also for these two color signals $C_1$ and $C_2$, the aforesaid response correction centering around respective reference frequency $f_0$ is effected similarly as described earlier.

In this situation, the reference frequency $f_0$ for response correction can be defined similarly as defined in the aforesaid embodiments 1 and 2. On the other hand, the reference frequency $f_c$ for color response correction relating to these two color signals $C_1$ and $C_2$ should be selected such as $f_c < f_0$, preferably the former $f_c$ being equal to about ⅛ to ¼ of the latter $f_0$, since the MTF of visual system for the color signal is generally inferior to that for the luminance signal.

The above response correction for the color channels can be readily effected by modifying the delay time durations of the delay lines and the cutoff frequencies of the filters in the configurations as shown in FIGS. 10 to 12.

In the response correction for the color channels as shown in FIG. 13, the colored contour signal to be added to the color picture signal has the color phase always opposite to that of the color picture signal, so that the discrimination of the colored contour from the color picture proper can be extremely readily effected for adjusting the focusing of the viewed color picture.

In this connection, in the situation where the surplus of transmission lines included in the camera cable, the horizontal, the vertical and the composite contour signals are sent to the camera head through the video return line in common. In the camera head, the Y/C separation is effected through the comb filter, the resultant luminance signal Y being added with the aforesaid contour signal and thereafter being further added with the three color difference signals R−Y, G−Y and B−Y respectively in parallel, which color difference signals have been obtained through the color demodulation.

The above described behavior of contour correction is indicated by the configuration as shown in FIG. 14.

Next, FIG. 15 shows further another example of the circuit configuration similarly provided for realizing the specially colored contour signal to be added to the monochromatic picture signal Y presented on the viewing screen only during the adjustment of focusing. In the configuration as shown in FIG. 15, the three primary color signals R, G, B are combined through a matrix circuit into a monochromatic picture signal Y which is distributed to respective inputs of the colored CRT through an interlocked switch $SW_0$ and respective adders individually supplied with the colored contour signal through respective switches $SW_1$ to $SW_3$ and a level adjuster.

FIG. 16 shows an example of experimental results carried out for clarifying the psychological effect on the visual distinctiveness of the contour colored in various color phases from monochromatic backgrounds of various luminances. In this experimental results, psychological measures indicating the visual distinctiveness are plotted on the ordinate with regard to three different states A, B and C on the abscissa, A indicating a colored stripe corresponding to the colored contour compared with a dark monochromatic background, B indicating the same stripe compared with the monochromatic background having the similar brightness and C indicating the same stripe compared with the bright monochromatic background. As is apparent from these experimental results, the contour colored in red or yellow is the most distinctive from the monochromatic background having various luminances. In this connection, it is preferable to substitute the color phase of the contour from yellow to magenta, since the psychological logical effect regarding the former is varied by the luminance of the background.

EMBODIMENT 4

Examples of concrete arrangement of the viewfinder according to the present invention will be described by referring to FIGS. 17(a) and 17(b) and 18(a) and 18(b).

FIGS. 17(a) and 17(b) show respectively outlined practical arrangement and circuit configuration of the viewfinder for broadcasting handy camera or industrial and domestic camera use. In these examples, the contour correction circuit is contained in the camera head, so that the contour signal, namely, the edge signal derived from the halfway of the contained contour correction circuit corresponds to the picture signal passed through the channel having the bandpass performance lumped in the vicinity of 245 TV lines obtained by the correction effected by about 3 MHz corresponding to 240 TV lines in the horizontal direction and by one scanning line preceding and following in the vertical direction as indicated by the curve I as shown in FIG. 9. In addition to this correction in the horizontal direction, the lowpass filter is further employed, so as to lower the lumped frequency toward the weighting function of sharpness as shown in FIG. 2. In this connection, this lowpass filter is approximately dispensable for simplicity.

The above contour signal alone or the picture signal added therewith is applied onto the viewfinder through a turnover switch, only when the focusing adjustment is carried out. In this situation, the more favorable effect can be obtained by applying the slightly excessive edge signal through the small sized turnover switch provided as readily operated and kept out of the way of other operations of the camera. For instance, a small sized push button type microswitch is provided in the vicinity of the focusing knob for the camera lens use, so that the cameraman carries out the focusing adjustment through the viewfinder while this switch is pushed by his finger. Thereafter, the ordinary picture signal on the main line can be applied onto the viewfinder by releasing his finger from this switch.

According to the above behavior of the focusing adjustment, the most accurate picture can be viewed in response to the most favorable focusing, so that it is possible to realize far ready and far rapid adjustment of focusing, even through a small viewing screen, in comparison with the ordinarily viewfinder screen.

Accordingly the accurate camera operation can be realized without the so-called trial and error even in the situation for collecting social news where the rapid focusing is required.

FIGS. 18(a) and 18(b) show outlined examples of an arrangement and a circuit configuration of a fixed type television camera. In this arrangement, the matter is the same as that as shown in FIGS. 17(a) and 17(b), except that it is required to return the picture signal on the main line and the contour signal, which are formed in the camera controller in common, through the camera cable.

Figure 19:
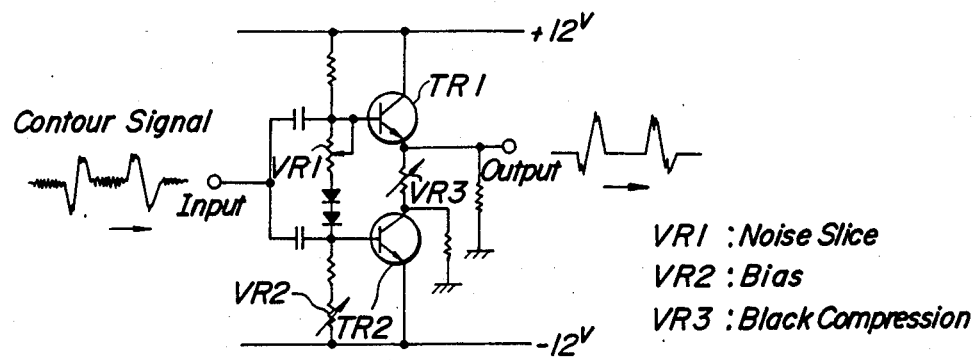
FIGS. 19 and 20(a) and 20(b) are diagrams showing examples of the behavior and the configuration of a contour signal coring circuit respectively.
Figure 20A:
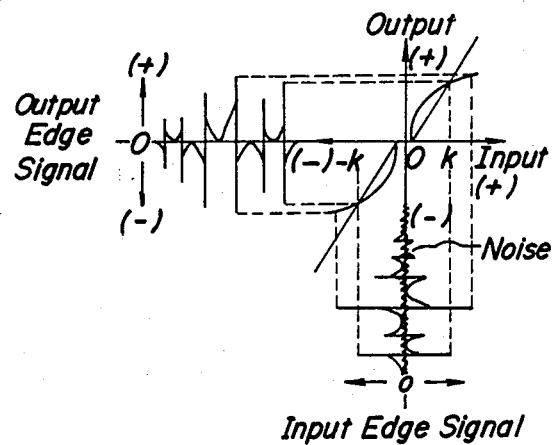
Figure 20B:
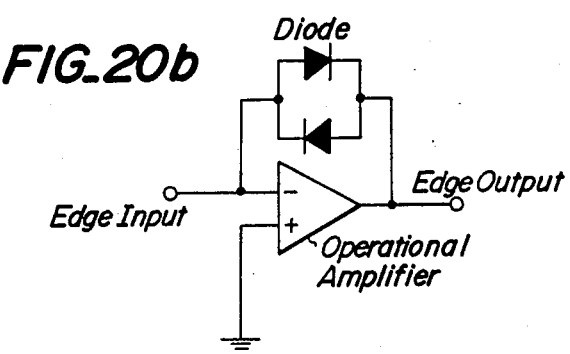

In addition, a further favorable effect can be obtained in a situation where the coring process as shown in FIGS. 19 and 20(a) and 20(b) is applied onto the contour signal to be utilized for performing the camera focusing according to the present invention. Particularly, it is true for the color viewfinder in which the generation of colored contour signal in the picture signal unnecessitated for the focusing adjustment can be prevented through the above coring process.

FIGS. 20(a) and 20(b) show examples of circuit configuration for effecting the nonlinear processing of the edge signal, in which the gain for the contour signal having large amplitudes is decreased, meanwhile the gain for the contour signal having small amplitudes is increased, and hence which is favorable for effecting the processing of the picture signal corresponding to a scenery in which dark portions and bright portions are mixed together, although the noise to signal ratio is slightly deteriorated.

EXPERIMENTAL RESULTS OF THE INVENTION

Lastly, experimental results indicating the improvement of the focusing in the viewfinder according to the present invention will be described.

Table 1 shows the experimental results obtained by employing the contour correction signal added with red edge signals for adjusting the focusing through a newly developed 6 inch colored CRT provided with a shadowmask of 0.3 mm pitch and provided in the viewfinder for television camera use.

Among these experimental results obtained through four subjects, experimental data obtained by the conventional focusing are shown in the column A, meanwhile those of the present invention are shown in the column B. The time duration required for the focusing adjustment is shortened substantially 30 to 40% according to the present invention, as shown in the column B/A.

In this connection, the remarks "front" and "rear" indicate the direction of focusing adjustment toward the front and toward the rear of the target respectively.

TABLE 1

| | Experimental Results (1) | | |
|---|---|---|---|
| Testee | 6 inch color VF (without edge) (A) | 6 inch color VF (with red edge) (B) | Improvement ratio (B/A) |
| L | (front) 8.81 sec. | (front) 3.46 sec. | 0.392 |
| | (rear) 10.13 sec. | (rear) 2.25 sec. | 0.222 |
| M | (front) 6.84 sec. | (front) 3.84 sec. | 0.561 |
| | (rear) 7.78 sec. | (rear) 3.19 sec. | 0.410 |
| N | (front) 9.0 sec. | (front) 4.68 sec. | 0.520 |
| | (rear) 9.94 sec. | (rear) 3.56 sec. | 0.358 |
| O | (front) 7.87 sec. | (front) 1.31 sec. | 0.166 |
| | (rear) 4.68 sec. | (rear) 1.687 sec. | 0.360 |

Table 2 shows the experimental results obtained with regard to the handy camera provide with the viewfinder having the 1.5 inch CRT. As is apparent from these results, the improvements attained according to the present invention is inferior to those as shown in Table 1. However, the fair improvement can be attained in response to the kinds of scenery.

It is apparent from these experimental results that, according to the present invention, the accurately bright or colored edge portions of the viewed picture can be obtained when the most favorable focusing is attained, meanwhile the dark or uncolored edge portions thereof are viewed when the focusing is erroneously performed, so that the focusing adjustment with lightened burden and diminished fatigue on the cameraman can be realized.

In this connection, the sceneries presented in the experiment as shown in Table 2 are selected among those standardized by NHK, that is, a scenery in a dining room, a lady with a yellow beret cap on and a scenery containing a moat.

TABLE 2

| | | Experimental Results (2) | | | | | | | |
|---|---|---|---|---|---|---|---|---|---|
| | | Scenery | | | | | | | |
| | | Restaurant (NHK pattern) | | | Beret cap (NHK pattern) | | | Moat (NHK pattern) | | |
| Testee | | without edge (A) | with edge (B) | B/A | without edge (A) | with edge (B) | B/A | without edge (A) | with edge (B) | B/A |
| P | (front) | 6.19 | 3.19 | 0.51 | 19.69 | 3.75 | 0.19 | 8.06 | 6.19 | 0.77 |
| | (rear) | 4.13 | 3.75 | 0.91 | 6.56 | 2.81 | 0.43 | 8.06 | 5.44 | 0.67 |
| Q | (front) | 16.88 | 13.50 | 0.80 | 21.56 | 15.94 | 0.74 | 17.81 | 10.31 | 0.58 |
| | (rear) | 18.75 | 13.13 | 0.70 | 28.13 | 12.19 | 0.43 | 17.81 | 17.81 | 1.00 |
| R | (front) | 5.44 | 0.94 | 0.17 | 3.55 | 1.88 | 0.53 | 5.06 | 2.44 | 0.48 |
| | (rear) | 4.50 | 2.06 | 0.46 | 3.94 | 2.44 | 0.62 | 4.13 | 2.25 | 0.54 |
| S | (front) | 6.94 | 3.00 | 0.43 | 7.50 | 4.31 | 0.58 | 8.06 | 5.63 | 0.70 |
| | (rear) | 7.13 | 4.13 | 0.58 | 5.25 | 3.75 | 0.71 | 6.94 | 6.00 | 0.86 |
| T | (front) | 2.81 | 1.50 | 0.53 | 3.94 | 3.00 | 0.76 | 2.63 | 1.50 | 0.57 |
| | (rear) | 3.19 | 1.13 | 0.35 | 3.94 | 1.88 | 0.48 | 2.63 | 2.63 | 1.00 |
| U | (front) | 1.50 | 0.75 | 0.50 | 6.00 | 1.13 | 0.19 | 1.13 | 1.13 | 1.00 |
| | (rear) | 2.81 | 1.88 | 0.67 | 2.81 | 1.50 | 0.53 | 1.31 | 1.31 | 1.00 | unit in sec.

As is apparent from the described above, according to the present invention, the picture to be displayed on the small-sized viewfinder attached to the television camera can be adaptive to the visual system performance and hence becomes extremely accurate, so that the focusing of the target can be far more readily and rapidly effected in comparison with the conventional.

In addition, as for the television camera for broadcast use, the above described effect of the present invention can be readily attained by returning the contour correction signal generated in the contour correction circuit provided in the camera controller to the viewfinder attached to the television camera under the approximate adaptation to the visual system performance, particularly, extremely economically with a few necessarily attached circuits. As a result, the color viewfinder, which has been regarded as difficult to be realized because of the difficulty of favorable focusing, can be readily realized with the remarkably favorable merit in the field of broadcast program production.

Particularly, the one touch adjustment of the most suitable focusing without trial and error can be facilitated by the exclusive employment of the correction signal in all kinds of viewfinders attached not only to the small-sized handy camera but also the standard studio cameras including those for high definition television use.

In this connection, the present invention canot be restrictedly applied only to the viewfinder for TV camera use but also to all kinds of television image display equipments to be viewed at a distance being about three times of the screen height.

We claim:
1. A viewfinder for a TV camera in which a contour of a viewed picture is emphasized so as to correspond to the sharpness corrected for the spatial frequency performance of a visual system at close viewing distance of about three times of a screen height, comprising:
    at least one contour signal forming means for forming a contour signal representing said contour by subtracting each of respective halves of non-delayed and full-delayed picture signals from a half-delayed picture signal respectively obtained through a series connection of first and second delay circuits individually having delay time related to a screen size of said viewfinder, said series connection being applied with an input picture signal, said input signal, an output of said first delay circuit, and an output of said second delay circuit providing said non-delayed, half-delayed and full-delayed picture signals, respectively;
    wherein said at least one contour signal forming means is provided for at least the horizontal scanning direction of the viewing screen.
2. A viewfinder for a TV camera as claimed in claim 1, wherein the contour signal is applied through a colored contour signal forming means to the viewing screen, so as to partially color the emphasized contour of the viewed picture in red or reddish color.

3. A viewfinder for a TV camera as claimed in claim 1, further comprising:

a pushbutton type switching means unified with a focus adjusting means for applying the contour signal to the viewing screen only when the focussing of the viewed picture is adjusted.

4. A viewfinder for a TV camera as claimed in claim 2, wherein said viewed picture is decolored into a monochromatic picture when the colored contour signal is applied to the viewing screen.

* * * * *